US007970415B2

(12) United States Patent
Mikan et al.

(10) Patent No.: US 7,970,415 B2
(45) Date of Patent: *Jun. 28, 2011

(54) LOCATION CACHING WITH EXPIRATION BASED ON LOCATION

(75) Inventors: Jeffrey Clinton Mikan, Cumming, GA (US); Justin McNamara, Atlanta, GA (US); Fulvio Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 742 days.

This patent is subject to a terminal disclaimer.

(21) Appl. No.: 11/953,495

(22) Filed: Dec. 10, 2007

(65) Prior Publication Data

US 2008/0090589 A1 Apr. 17, 2008

Related U.S. Application Data

(63) Continuation of application No. 11/196,015, filed on Aug. 3, 2005, now Pat. No. 7,346,360.

(51) Int. Cl.
*H04W 24/00* (2009.01)
(52) U.S. Cl. ........... 455/456.2; 455/456.1; 455/404.2
(58) Field of Classification Search .......... 455/404.1, 455/404.2, 456.1–457
See application file for complete search history.

(56) References Cited

U.S. PATENT DOCUMENTS

| 6,961,562 | B2 * | 11/2005 | Ross | 455/425 |
|---|---|---|---|---|
| 7,298,729 | B2 * | 11/2007 | Fujii | 370/349 |
| 7,428,571 | B2 * | 9/2008 | Ichimura | 709/203 |
| 7,528,723 | B2 * | 5/2009 | Fast et al. | 340/572.1 |
| 2003/0101225 | A1 | 5/2003 | Han et al. | |
| 2005/0043037 | A1 | 2/2005 | Ioppe et al. | |
| 2005/0130680 | A1 | 6/2005 | Northcutt | |
| 2006/0101005 | A1 * | 5/2006 | Yang et al. | 707/3 |
| 2006/0128395 | A1 * | 6/2006 | Muhonen | 455/456.1 |

* cited by examiner

*Primary Examiner* — Anthony S Addy
(74) *Attorney, Agent, or Firm* — Zagorin O'Brien Graham LLP

(57) ABSTRACT

A system for locating a device in a wireless network that caches a known location and sets an expiration time based on the location. The system correlates the location with known places, such as movie theaters, restaurants, etc. to set the expiration time. For example, if a device was known to be at a movie theater, the expiration time would be set to a longer period of time. However, if the device was determined to be in a moving location, the expiration time would be set to a shorter period of time. The system also includes a mechanism to query the cached location based on a current time of the query and a granularity variable the accounts for a geographic area in which the device is located. The system also accounts for special locations where the mobile device will likely not be moving for long periods of time, or locations where the mobile device may move great distances between determinations of actual location.

18 Claims, 3 Drawing Sheets

US 7,970,415 B2

LOCATION CACHING WITH EXPIRATION BASED ON LOCATION

This application is a continuation application of U.S. application Ser. No. 11/196,015 filed Aug. 3, 2005, which is hereby incorporated by reference as to the entire contents thereof.

FIELD OF THE INVENTION

The present invention is directed to determining location of a mobile device. In particular, the present invention is directed to a system for caching a location of the mobile device.

BACKGROUND OF THE INVENTION

Global system for mobile communication (GSM) is one of the most widely used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Determining a location of a subscriber's mobile station/handset is often desirable. However, this determination increases radio traffic to the mobile station. Also, many operators of public mobile land networks (PLMN) incur a per/transaction fee for queries to location services. Given the anticipated number of location-based services, these fees may become quite substantial.

SUMMARY OF THE INVENTION

A system for locating a device in a wireless network that caches a known location and sets an expiration time based on the location. The system correlates the location with known places, such as movie theaters, restaurants, etc., to set the expiration time. For example, if a device was known to be at a movie theater, the expiration time would be set to a longer period of time. However, if the device was determined to be in a moving location, the expiration time would be set to a shorter period of time. The system also includes a mechanism to query the cached location based on a current time of the query and a granularity variable the accounts for a geographic area in which the device is located. The system also accounts for special locations where the mobile device will likely not be moving for long periods of time, or locations where the mobile device may move great distances between determinations of actual location.

DETAILED DESCRIPTION OF THE INVENTION

Figure 1:
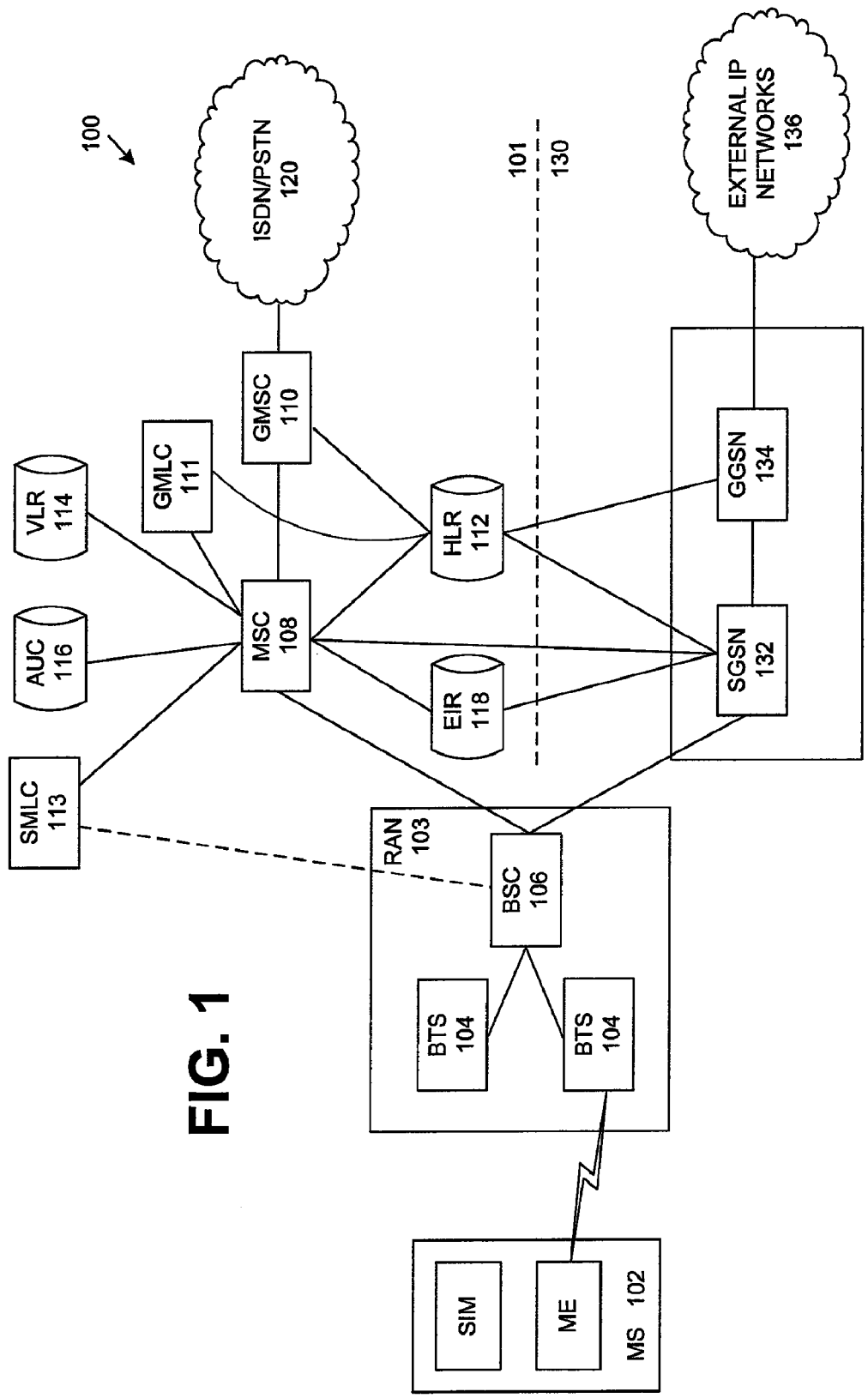
FIG. 1 is an overview of an exemplary wireless communication environment.

FIG. 1 shows a GSM/GPS network architecture 100 that includes a GSM core network 101 and a GPRS network 130.

The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

Location services (LCS) are provided by a Gateway Mobile Location Center (GMLC) 111 and/or a Serving Mobile Location Center (SMLC) 113. The GMLC 111 may request routing information from the HLR 112 and send positioning requests to either the Visited Mobile Switching Centre (VMSC, not shown), a Serving GPRS Support Node (SGSN 132) or MSC 108, and receives final location estimates from the corresponding entity.

The SMLC 113 is either a separate network element or an integrated functionality in the BSC 106. The SMLC manages the overall coordination and scheduling of resources required for the location of an MS 102. The SMLC 1113 also calculates the final location estimate and estimates the achieved accuracy. The SMLC 113 may control a number of Location Measurement Unit (LMU) for the purpose of obtaining radio interface measurements to locate or help locate MS subscribers in the area that it serves.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, the serving GPRS support node (SGSN) 132 and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM I, NOM2 and NOM3). Network operation modes of a GPRS network is indicated by a parameter in system information messages transmitted within a cell. The system information messages dictates a MS where to listen for paging messages and how signal towards the network. The network operation mode represents the capabilities of the GPRS network. In a NOM 1 network, a MS can receive pages from a circuit switched domain (voice call) when engaged in a data call. The MS can suspend the data call or take both simultaneously, depending on the ability of the MS, In a NOM2 network, a MS may not received pages from a circuit switched domain when engaged in a data call, since the MS is receiving data and is not listening to a paging channel In a NOW network, a MS can monitor pages for a circuit switched network while received data and vise versa.

Figure 2:
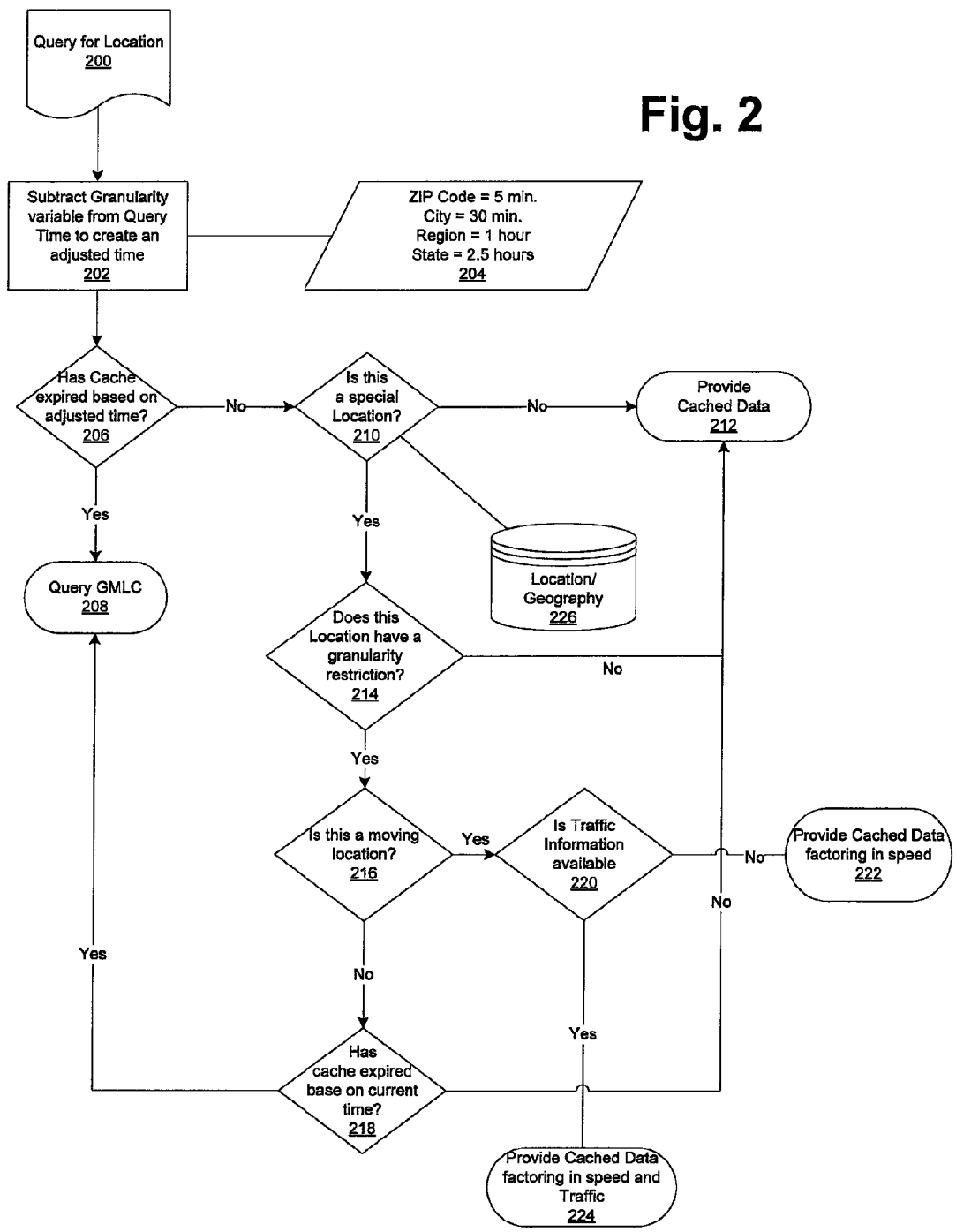
FIG. 2 is an exemplary process performed to query a location of a mobile station.

Referring now to FIG. 2, there is illustrated an exemplary process performed in a position engine to query for a location of, e.g., an MS using a cached location database. The position engine may be communicatively connected to the network 100 or within one of the elements therein discussed with reference to FIG. 1. A cached location database 226 enables the operator of the PLMN under certain circumstances to determine an estimated location of the MS, without the need to query the GMLC 111. This advantageously reduces RF traffic and costs.

The process begins at step 200, the query for location is made. At step 202, a granularity window variable is subtracted from a time that the query is made to create an adjusted time. The granularity variable is a time value that allows for proper caching based on the query request and is used to account for how long it would take for the average user to leave a geographic area. Exemplary granularities are shown in step 204. For example, a granularity variable for a ZIP code may be 5 minutes, whereas a granularity variable for a city may be 30 minutes. Larger areas, such as North Atlanta, may have a granularity variable of one hour and a state may have one of 2.5 hours. Additional (or fewer) granularity variable times maybe defined for different geographic areas. If a service is requesting a geographic area of the size of a city, then 30 minutes would be subtract from the current time (e.g., 12:00) to create an 11:30 adjusted time. If a cache value time was 11:40, the resulting adjusted time would be less than the cache value time (i.e., 11:30<11:40).

At step 206, it is determined if the cache has expired based on the adjusted time determined at step 202. If the cache has expired, then the GMLC (or other location service) is queried at step 208 for the actual location of the MS. If the cache is not expired, then it is determined at step 210 if the location of the MS is special. The location/geography database 226 contains a listing of special locations, which may include movie theaters, restaurants, etc. where it is likely that a subscriber will not be moving for long periods of time. Alternatively, the special locations may include airports where it is likely that the subscriber may be moving a great distance between actual queries of the MS. The location/geography database 226 also includes the cached location values, as noted above.

If the location is not special, the cached location is provided at step 212 in response to the query. If the location is special, then it is determined at step 214 if there is a granularity restriction for that location. Steps 202 and 206 check to see if granularity values allows the cached value to be used. If the cached value cannot be used, there is no reason to access the location cache database. However, if the cache can be used based on the granularity, then it is determined if it the location restricts the use of the granularity window. An example of places that would have granularity restrictions are airports, high speed trains, etc.

If there is not a restriction, the cached location data is provided at step 212. If there is a granularity restriction, then it is determined at step 216 if the MS is in a moving location, such as a roadway, railroad, etc. If it is in a moving location, then at step 220, it is determined if traffic and/or transit information is available about the location. If there is information available, the cached location data is provided factoring in the speed of the MS, as well as the traffic and/or transit information. For example, it may be determined that the MS is traveling at 65 MPH along a freeway, but there is road construction ahead of the cached location of the MS causing the average speed to drop to 20 MPH. With this information, the cached location data can be adjusted to reflect the change in speed in the construction zone.

If the MS is in a moving location, but there is no traffic information available, then the cached location data is provided at step 222, factoring in the speed of the MS.

Figure 3:
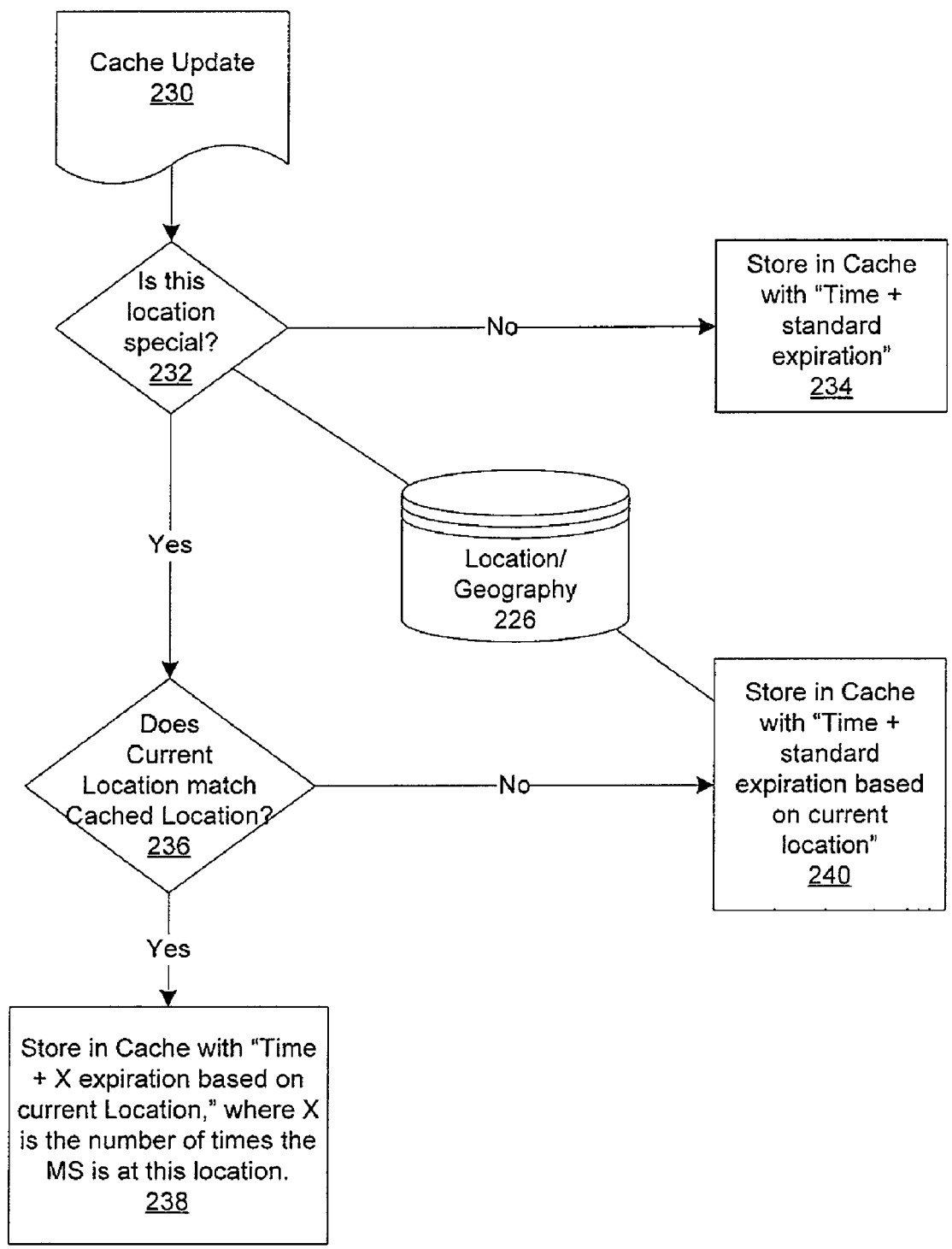
FIG. 3 is an exemplary process performed to update a location cache.

Referring now to FIG. 3, there is illustrated the exemplary process performed to update the information contained in the location cache. The process begins a step 230 where it is determined that a cache update is to be performed. Next, at step 232, it is determined if the location to be updated is special, as described above. If the location is not special, then at step 234 the location information is stored in the cache with a current time plus standard expiration increment. The standard expiration may be a value between 1 minute and 5 minutes based on the location and is used to determine for how long the value stored in the cache should be considered a good value. If the location is special (as stored in the location/geography database 226), then at step 236, it is determined if the current location of the MS matches the cached location in the database 226. If there is not a match at step 236, then the location information is stored in the cache with a time plus standard expiration based on the current/special location (step 240). If there is a match at step 236, then at step 238 the location information is stored in the cache with a time plus an "X expiration value" based on the current/special location, where X is the number of times the MS was determined to be a the special location.

The "X expiration value" may be determined as follows. The X expiration time preferably varies per iteration when it is determined that the MS is at a special place. For example, the first time the MS location is queried and it is determined that the MS is at, e.g., a movie theater, the location cache is expired in 5 minutes (assuming that tickets are being purchased). Upon a second query after expiration of the 5 minutes, if the MS is still at the movie theater, a new expiration may be set at 2 hours (assuming that a movie is being viewed). Following the 2 hour expiration, each subsequent expiration may be 10 minutes (i.e., assuming that the movie is still being viewed, but likely ending soon). Thus, in the database 226, the following may be stored:

| Location Type | Iteration | Time (minutes) |
|---|---|---|
| Theater | 1 | 5 |
| Theater | 2 | 120 |
| Theater | 3 | 10 |

It is noted that the X expiration value may be determined to be different times in accordance with different locations.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

We Claim:

1. A position engine for determining a location of a mobile device, comprising:
   a cached location database, said cached location database containing information regarding a cached location of said mobile device, said cached location having been previously determined by said position engine; and
   a processor operatively connected to said cached location database for receiving and processing a query for a present location of said mobile device, said query for said present location having a granularity associated therewith, said granularity representing a size of a geographic area associated with said present location of said mobile device;
   said granularity having a granularity variable associated therewith, said granularity variable representing a time required to leave the geographic area associated with said granularity;
   said position engine being configured to use said granularity variable to adjust a time of said query for said present location of said mobile device to determine whether a time during which said cached location can be returned in response to said query has expired;
   wherein said position engine is configured to determine, before adjusting said time of said query using said granularity variable, whether said cached location of said mobile device is a special location from which the mobile device will either likely not be moving for a long period of time or will likely be moving a great distance between subsequent queries of actual location.

2. The position engine of claim 1, configured to subtract said granularity variable from said time of said query to determine whether said time during which said cached location can be returned has expired.

3. The position engine of claim 2, further configured to determine a present location of said mobile device and return said present location in response to said query if said time during which said previously determined location can be returned has expired.

4. The position engine of claim 1, wherein determination of whether said previously determined location of said mobile device is a special location is made if said time during which said previously determined location can be returned in response to said query has not expired.

5. The position engine of claim 4, further configured to determine whether a restriction exists on a validity of said previously determined location as a response to said query if said previously determined location is a special location.

6. A position engine for determining a location of a mobile device, comprising:
   a cached location database, said cached location database containing information regarding a cached location of said mobile device, said cached location having been previously determined by said position engine; and
   a processor operatively connected to said cached location database for receiving and processing a query for a present location of said mobile device, said present location having a granularity associated therewith, said granularity representing a size of a geographic area associated with said present location of said mobile device;
   said granularity having a granularity variable associated therewith, said granularity variable representing a time required to leave the geographic area associated with said granularity;
   said position engine configured to subtract said granularity variable from a time of said query for said present location of said mobile device to determine whether said cached location can be returned in response to said query; said position engine configured to determine, before subtracting said granularity variable from said time of said query, whether said cached location of said mobile device is a special location from which the mobile device will either likely not be moving for a long period of time or will likely be moving a great distance between subsequent queries of actual location.

7. The position engine of claim 6, further wherein said position engine determines whether a granularity restriction is associated with said special location.

8. The position engine of claim 7, wherein said granularity restriction prevents use of said cached location as a return value for said query of said present location of said mobile device.

9. The position engine of claim 6, further wherein said position engine determines a current location of said mobile device in response to said query if said cached location cannot be returned in response to said query.

10. The position engine of claim 6, further wherein said position engine returns said current location in response to said query and updates said cached location in said memory to said current location.

11. The position engine of claim 6, wherein said position engine further determines whether said special location is a moving location.

12. The position engine of claim 11, wherein said position engine further determines whether movement information associated with said moving location is available, said position engine using said movement information in determining a current location of said mobile device.

13. The position engine of claim 12, wherein said movement information includes information regarding a speed of said moving location.

14. The position engine of claim 12, wherein said movement information includes information regarding at least one of traffic and transit information associated with said moving location.

15. A location cache for use in determining a location of a mobile device, comprising:
a first memory including a location cache containing information regarding a cached location of said mobile device, said first memory further containing information regarding a cached location time at which said cached location was determined;
said location cache being updated with an actual location of said mobile device in response to a query for a current location of said mobile device if said cached location has expired, said expiration being based on said cached location time, a granularity of a geographic area associated with said queried location, and a granularity variable, said granularity variable representing a time required to travel from said cached location to an outer boundary of said geographic area;
said location cache including information regarding a special location from which the mobile device will either likely not be moving for a long period of time or will likely be moving a great distance between subsequent queries of actual location; and
wherein said granularity variable is subtracted from a time of said query for said current location of said mobile device to determine an adjusted time of said query.

16. The location cache of claim 15, wherein said cached location expires if said adjusted time is greater than said cached location time.

17. The location cache of claim 15, said location cache being operatively connected to a position determining engine, wherein location cache obtains information of said actual location of said mobile device from said position determining engine.

18. The location cache of claim 17, wherein said location cache obtains said actual location of said mobile device from said position determining engine if said cached location has expired, said cached location expiring if said adjusted time is greater than said cached location time.

* * * * *

UNITED STATES PATENT AND TRADEMARK OFFICE
CERTIFICATE OF CORRECTION

| | | |
|---|---|---|
| PATENT NO. | : 7,970,415 B2 | Page 1 of 1 |
| APPLICATION NO. | : 11/953495 | |
| DATED | : June 28, 2011 | |
| INVENTOR(S) | : Jeffrey Clinton Mikan et al. | |

It is certified that error appears in the above-identified patent and that said Letters Patent is hereby corrected as shown below:

ON THE TITLE PAGE:

Item (57), line 11 of Abstract, please replace "variable the accounts" with --variable that accounts--

IN THE SPECIFICATIONS:

Col. 1, line 48, please replace "variable the accounts" with --variable that accounts--

Col. 3, line 60, please replace "vise versa" with --vice versa--

Col. 4, line 39, please replace "values allows" with --values allow--

Signed and Sealed this
Thirtieth Day of August, 2011

David J. Kappos
*Director of the United States Patent and Trademark Office*